United States Patent
Hornung et al.

(10) Patent No.: US 6,473,845 B1
(45) Date of Patent: Oct. 29, 2002

(54) SYSTEM AND METHOD FOR DYNAMICALLY UPDATING MEMORY ADDRESS MAPPINGS

(75) Inventors: Bryan Hornung, Plano, TX (US); Michael L. Ziegler, Campbell; Michael K. Traynor, San Jose, both of CA (US); Gregory S. Palmer, Plano, TX (US)

(73) Assignee: Hewlett-Packard Company, Palo Alto, CA (US)

( * ) Notice: Subject to any disclaimer, the term of this patent is extended or adjusted under 35 U.S.C. 154(b) by 107 days.

(21) Appl. No.: 09/675,021

(22) Filed: Sep. 28, 2000

(51) Int. Cl.[7] .......................... G06F 13/00; G06F 12/00
(52) U.S. Cl. ...................... 711/165; 711/202; 711/162; 711/221
(58) Field of Search ................................. 711/103, 162, 711/202, 221, 165

(56) References Cited

U.S. PATENT DOCUMENTS

| | | | | |
|---|---|---|---|---|
| 4,695,947 A | | 9/1987 | Ikeda et al. ................... 364/200 |
| 4,833,604 A | * | 5/1989 | Cheng et al. ................ 707/200 |
| 5,230,045 A | | 7/1993 | Sindhu ........................ 395/425 |
| 5,255,270 A | * | 10/1993 | Yanai et al. .................... 360/53 |
| 5,369,616 A | * | 11/1994 | Wells et al. ............ 365/185.22 |
| 5,388,083 A | * | 2/1995 | Assar et al. ............ 365/185.09 |
| 5,404,485 A | * | 4/1995 | Ban ............................ 711/202 |
| 5,479,629 A | * | 12/1995 | Angjelo et al. .............. 711/206 |
| 5,479,638 A | * | 12/1995 | Assar et al. ................. 706/900 |
| 5,485,595 A | * | 1/1996 | Assar et al. ........... 365/185.11 |
| 5,671,229 A | * | 9/1997 | Harari et al. ................ 365/200 |
| 5,761,695 A | | 6/1998 | Maeda et al. ................... 711/5 |
| 5,832,493 A | * | 11/1998 | Marshall et al. .............. 700/90 |
| 5,835,954 A | | 11/1998 | Duyanovich et al. ........ 711/162 |
| 5,848,026 A | * | 12/1998 | Ramamurthy et al. . 365/230.03 |
| 5,963,970 A | * | 10/1999 | Davis ..................... 365/185.11 |
| 6,000,006 A | * | 12/1999 | Bruce et al. ................. 711/103 |
| 6,014,724 A | * | 1/2000 | Jenett .......................... 711/103 |
| 6,047,362 A | * | 4/2000 | Zucker ........................ 711/133 |

\* cited by examiner

*Primary Examiner*—Hong Kim

(57) ABSTRACT

In general, a system and method is provided for dynamically reallocating computer memory. A mapper receives requests to access data. The requests include bus addresses, and the mapper maps the bus addresses to memory unit addresses based on a plurality of mappings maintained by the mapper. The memory unit addresses identify a plurality of memory locations including a destination memory location and a source memory location. Data requested by the requests received by the mapper is accessed based on the memory unit addresses mapped from the bus addresses included in the requests. When desired, a data value from the source memory location is dynamically moved to the destination memory location, and the mappings are updated such that a bus address mapped to a memory unit address identifying the source memory location is instead mapped to a memory unit address identifying the destination memory location.

15 Claims, 8 Drawing Sheets

SYSTEM AND METHOD FOR DYNAMICALLY UPDATING MEMORY ADDRESS MAPPINGS

BACKGROUND OF THE INVENTION

1. Field of the Invention

The present invention generally relates to data processing techniques and, in particular, to a system and method for dynamically reallocating memory in a computer system while ensuring that the reallocation does not introduce data errors.

2. Related Art

Large computer systems (or servers) often employ a plurality of memory units to provide enough instruction and data memory for various applications. Each memory unit has a large number of memory locations of one or more bits where data can be stored, and each memory location is associated with and identified by a particular memory address, referred to hereafter as "memory unit address." When an instruction that stores data is executed, a bus address defined by the instruction is used to obtain a memory unit address, which identifies the memory location where the data is actually to be stored. In this regard, a mapper is often employed that maps or translates the bus address into a memory unit address having a different value than the bus address. There are various advantages associated with utilizing bus addresses that are mapped into different memory unit addresses.

For example, many computer applications are programmed such that the bus addresses are used consecutively. In other words, one of the bus addresses is selected as the bus address to be first used to store data. When a new bus address is to be utilized for the storage of data, the new bus address is obtained by incrementing the previously used bus address.

If consecutive bus addresses are mapped to memory unit addresses in the same memory unit, then inefficiencies may occur. In this regard, a finite amount of time is required to store and retrieve data from a memory unit. If two consecutive data stores occur to the same memory unit, then the second data store may have to wait until the first data store is complete before the second data store may occur. However, if the two consecutive data stores occur in different memory units, then the second data store may commence before the first data store is complete. To minimize memory latency and maximize memory bandwidth, consecutive bus addresses should access as many memory units as possible. This can also be described as maximizing the memory interleave.

As a result, the aforementioned mapper is often designed to map the bus addresses to the memory unit addresses such that each consecutive bus address is translated into a memory unit address in a different memory unit. For example, a bus address having a first value is mapped to a memory unit address identifying a location in a first memory unit, and the bus address having the next highest value is mapped to a memory unit address identifying a location in a second memory unit. Therefore, it is likely that two consecutive data stores from a single computer application do not occur in the same memory unit. In other words, it is likely that consecutive data stores from a computer application are interleaved across the memory units.

There are situations when it is desirable to move the data values stored in some locations of one or more of the memory units to other locations in one or more of the memory units. For example, it may be desirable to remove one of the memory units when the memory unit is performing unreliably. To prevent the loss of data that may be stored in the memory unit to be removed, the computer system employing the memory unit is often shut down before removing the memory unit. Once the memory unit has been removed, the computer system is rebooted. The shutting down and rebooting of the computer system is an obviously undesirable consequence of removing the memory unit, since the computer system is unable to run any applications until the reboot is completed.

Some techniques have been developed that allow a memory unit to be removed from the computer system without shutting down the computer system. For example, the processor's virtual memory mapping system may be used to re-map the physical addresses. This results in the temporary halting of applications and the copying of data from the memory unit being removed to a disk or some other data storage device until the removed memory unit is replaced by a new memory unit. The primary reason for halting the executions of applications is to prevent attempts to store to and/or retrieve from the memory unit being removed so that data errors are prevented. All threads in a multi-threaded application as well as the I/O system should always have a consistent view of a memory location.

Once the removed memory unit has been replaced, the aforementioned data copied from the removed memory unit is then written to the new memory unit. Then, execution of applications is resumed. While the foregoing techniques lessen the amount of time that the computer system is unable to run applications, there is still a finite amount of time in which the computer system is unable to run an application.

It should be noted that there are other situations in which it may be desirable to move data. For example, another situation in which moving data in memory may be desirable is to improve the interleave for a memory range and, therefore, improve system performance. Whenever data is moved from and/or to a different memory unit, it is desirable to minimize the amount of time that the computer system is unable to run an application.

Thus, a heretofore unaddressed need exists in the industry for providing a system and method for dynamically reallocating memory in a computer system such that data is moved among different memory locations without requiring the computer system to halt execution of applications.

SUMMARY OF THE INVENTION

The present invention overcomes the inadequacies and deficiencies of the prior art as discussed hereinbefore. Generally, the present invention provides a system and method for dynamically reallocating computer memory.

In architecture, the system of the present invention utilizes a plurality of memory units, a mapper, and a system manager. Each of the memory units includes memory locations for storing data. These data values are accessed in response to requests transmitted from one or more processing units coupled to the mapper. When the mapper receives a request to access a data value, the mapper translates a bus address included in the request into a memory unit address based on one of a plurality of mappings maintained by the mapper. The memory unit address identifies one of the memory locations that is storing the requested data value.

In moving the data value from a source memory location to a destination memory location, a pointer that identifies the source memory location is stored in the destination memory location. While the pointer is stored in the destination memory location, the system manager causes the mappings to be updated such that the mapper is configured to translate the aforementioned bus address into a memory unit address identifying the destination memory location. If the bus address of a request received by the mapper is translated into a memory unit address identifying the destination memory location before the aforementioned data value is moved from the source memory location to the destination memory location, then the pointer will be accessed in response to the request. Therefore, accessing the pointer indicates that the requested data value should be accessed from the source memory location rather than the destination memory location.

The present invention can also be viewed as providing a method for dynamically moving data from one memory location to another memory location. The method can be broadly conceptualized by the following steps: receiving requests to access data, the requests including bus addresses; mapping the bus addresses to memory unit addresses based on a plurality of mappings, the memory unit addresses identifying a plurality of memory locations including a destination memory location and a source memory location; accessing data based on the memory unit addresses mapped from the bus addresses; dynamically moving a data value from the source memory location to the destination memory location; and updating the mappings such that a bus address mapped to a memory unit address identifying the source memory location is mapped to a memory unit address identifying the destination memory location.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
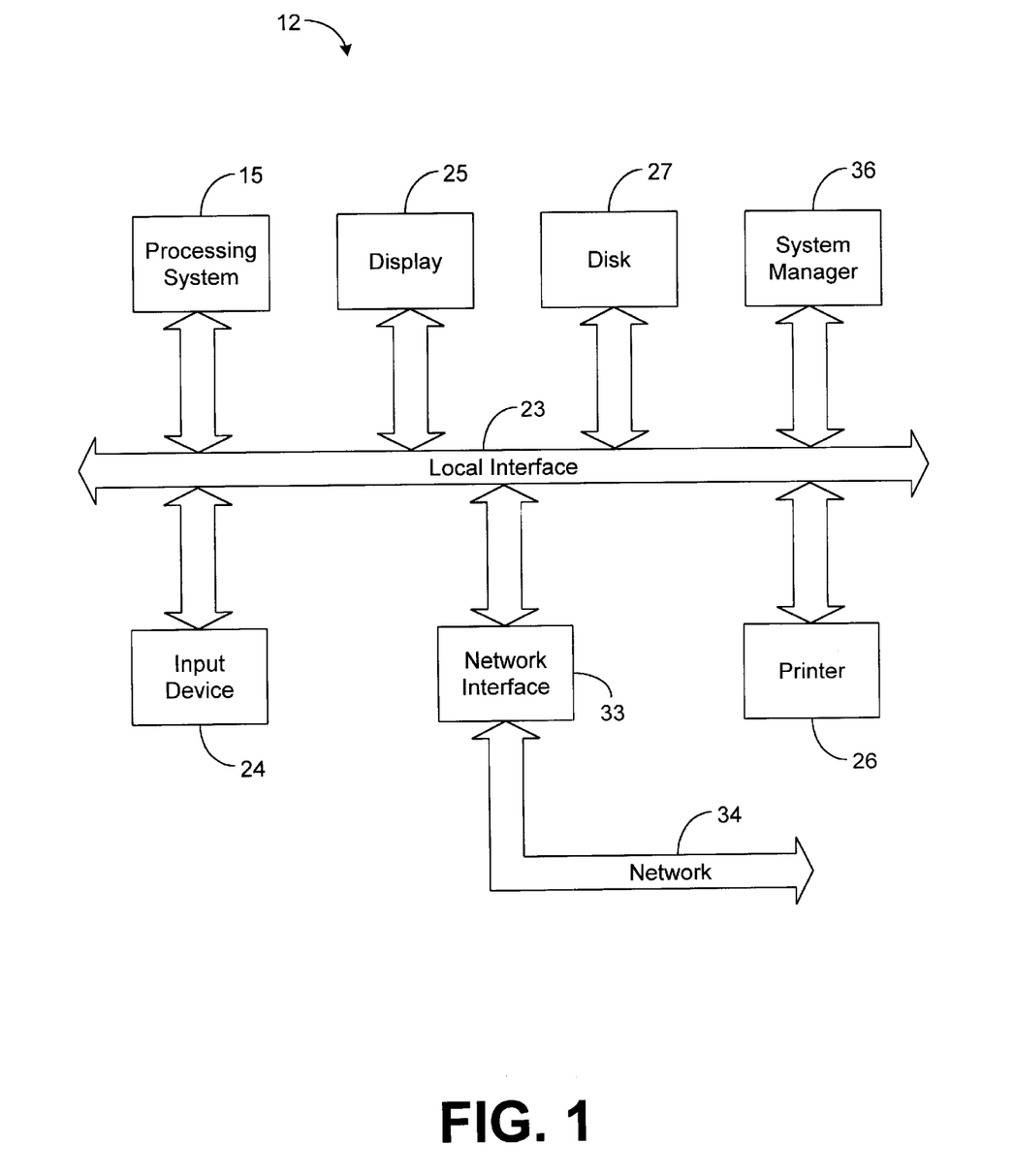
FIG. 1 is a block diagram illustrating a computer system employing a processing system in accordance with the present invention.

The present invention generally relates to a system and method for dynamically reallocating computer memory. FIG. 1 depicts a computer system 12 that may be utilized to implement the present invention. As shown by FIG. 1, the computer system 12 includes a processing system 15 configured to execute instructions of computer applications that are preferably stored in memory included in the processing system 15. The processing system 15 communicates to and drives the other elements within the computer system 12 via a local interface 23, which can include one or more buses. Furthermore, an input device 24, for example, a keyboard or a mouse, can be used to input data from a user of the system 12, and screen display 25 or a printer 26 can be used to output data to the user. A disk storage mechanism 27 can be connected to the local interface 23 to transfer data to and from a nonvolatile disk (e.g, magnetic, optical, etc.). The system 12 can be connected to a network interface 33 that allows the system 12 to exchange data with a network 34.

The computer system 12 also includes a system manager 36 that is used to control the operation of the computer system 12, as will be described in more detail hereinafter. The system manager 36 can be implemented in software, hardware, or a combination thereof. Note that the system manager 36, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. For example, instructions defined by the system manager 36 can be executed by one or more processors in the processing system 15.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
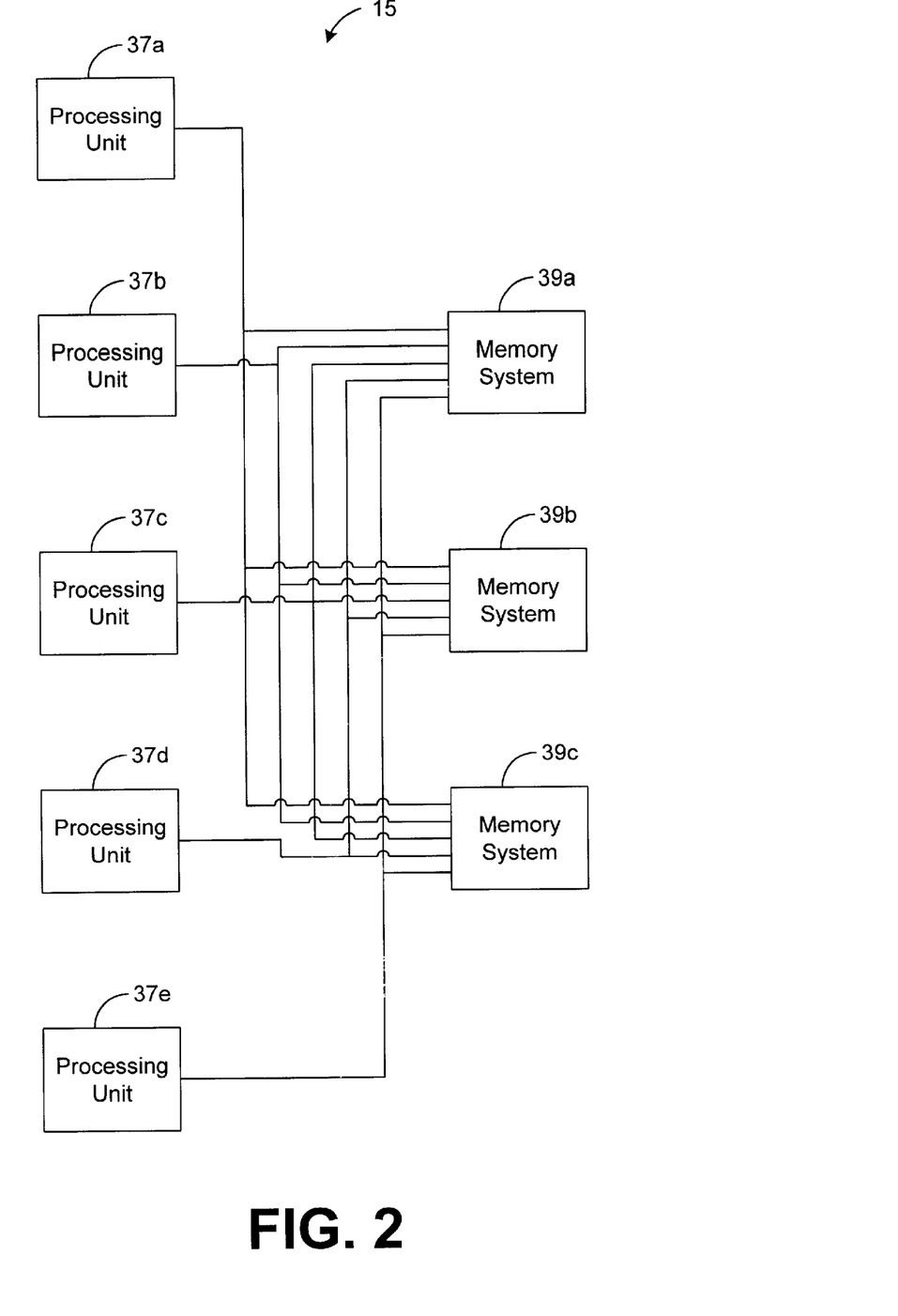
FIG. 2 is a block diagram illustrating a more detailed view of the processing system depicted in FIG. 1.
Figure 3:
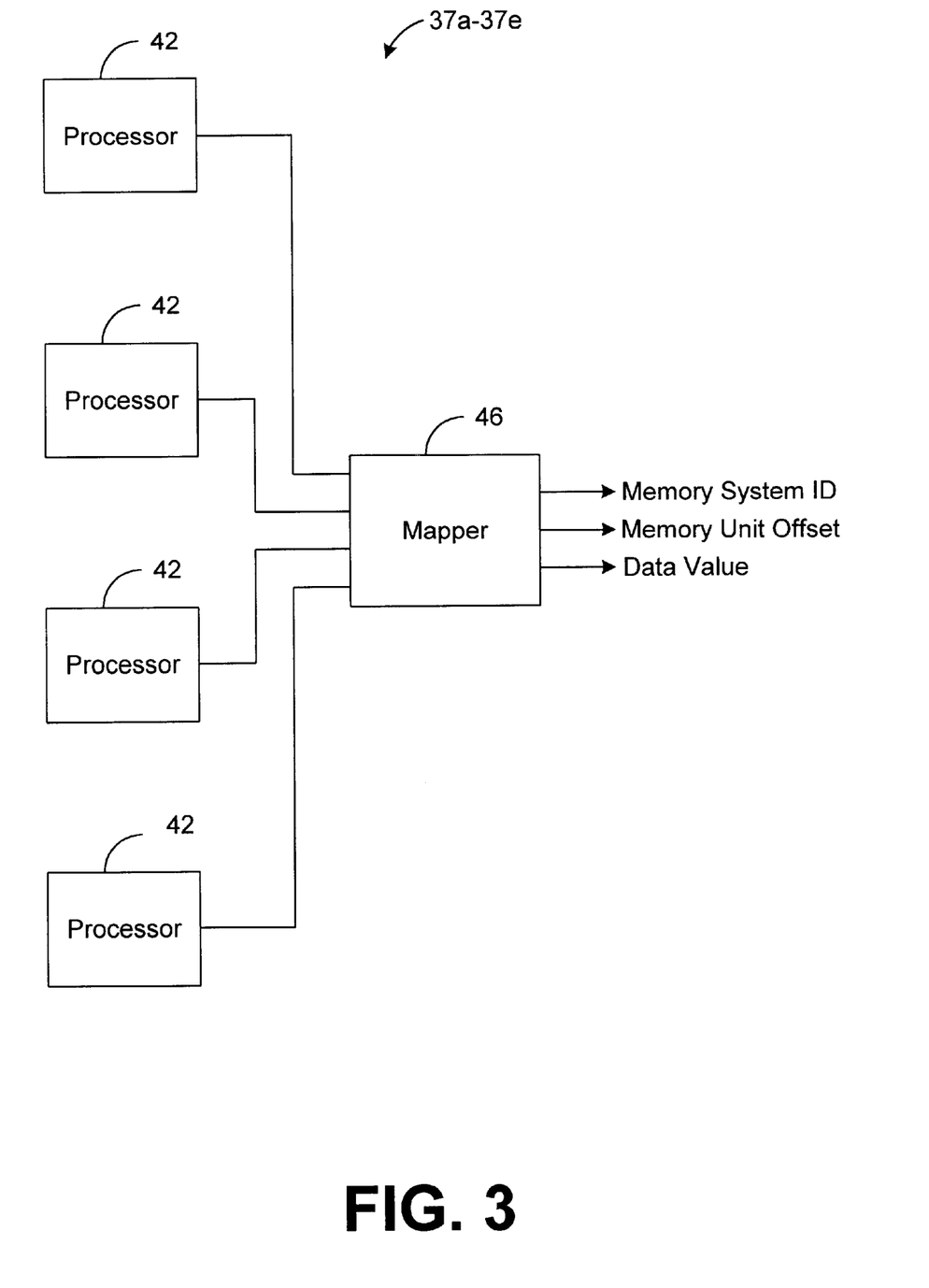
FIG. 3 is a block diagram illustrating a more detailed view of processing units depicted in FIG. 2.

As shown by FIG. 2, the processing system 15 includes a plurality of processing units 37a–37e coupled to a plurality of memory systems 39a–39c. As shown by FIG. 3, each processing unit 37a–37e includes one or more processors 42 that are configured to execute instructions via techniques well known in the art. These instructions are preferably defined by computer applications stored in one or more of the memory systems 39a–39c.

When a data value is to be stored in response to execution of an instruction by one of the processors 42, the processor 42 transmits a storage request to a mapper 46. The storage request includes the data value to be stored and a bus address indicative of where the foregoing data value is to be stored. The mapper 46 is configured to map the bus address into a memory unit address including a memory system identifier and a memory unit offset. The memory system identifier identifies one of the memory systems 39a–39c. The mapper 46 is configured to transmit a write request including the data value to be stored, the memory system identifier, and the memory unit offset to each of the memory systems 39a–39c.

Figure 4:
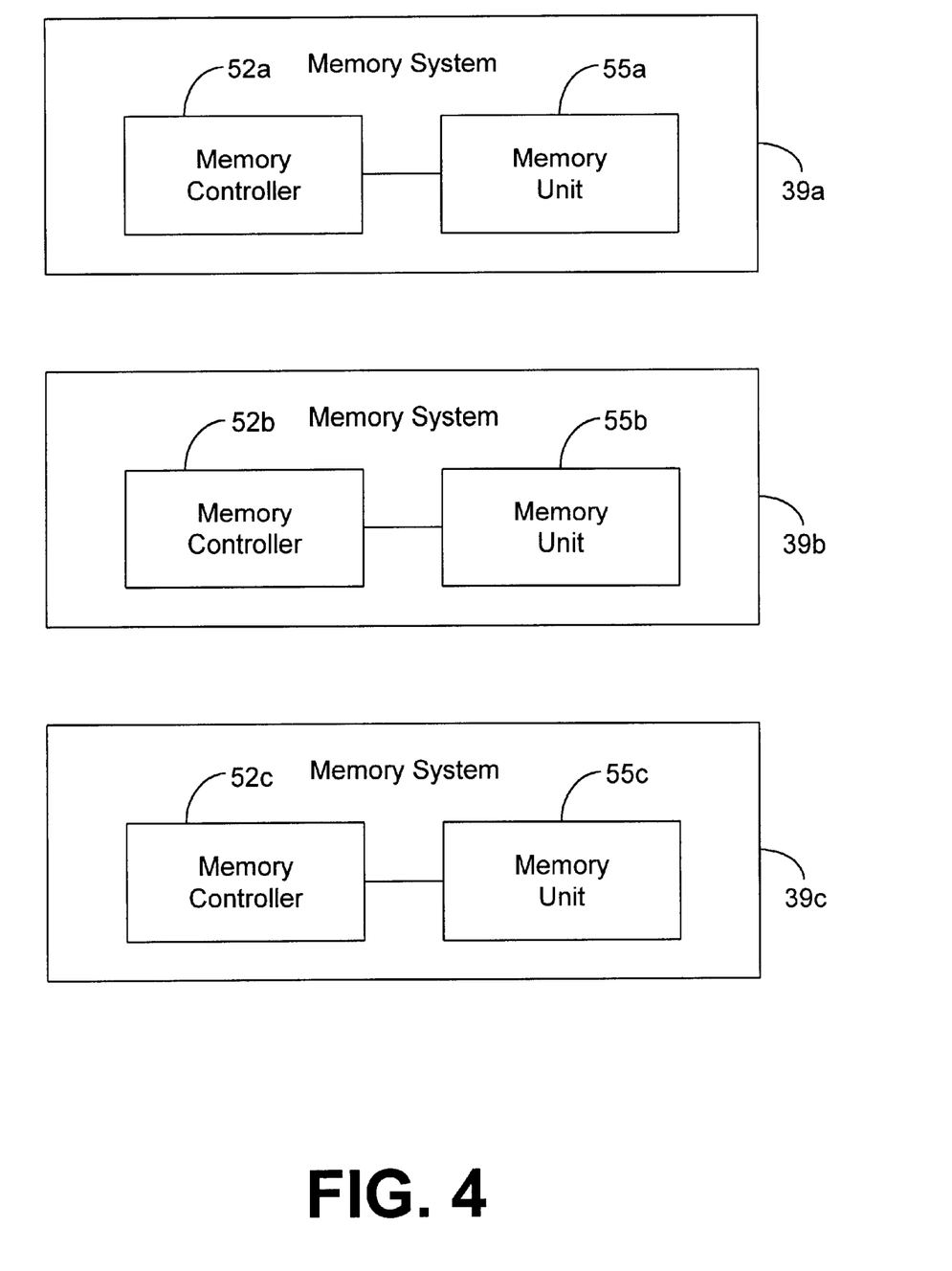
FIG. 4 is a block diagram illustrating a more detailed view of memory systems depicted in FIG. 2.

As shown by FIG. 4, each of the memory systems 39a–39c includes a memory controller 52a–52c, respectively, and a memory unit 55a–55c, respectively. Each of the memory units 55a–55c includes a plurality of memory locations where data can be stored and retrieved. The memory controller 52a, 52b, or 52c of the memory system 39a, 39b, or 39c identified by the aforementioned memory system identifier is configured to store the foregoing data value (i.e., the data value received along with the memory system identifier and the memory unit offset) into the memory unit 55a, 55b, or 55c of the identified memory system 39a, 39b, or 39c based on the memory unit offset. In this regard, the memory unit offset identifies a location in each of the memory units 55a–55c, and the memory controller 52a, 52b, or 52c in the identified memory system 39a, 39b, or 39c is configured to store in the foregoing memory unit 55a, 55b, or 55c the received data value at the location identified by the memory unit offset.

To increase the performance of the processing system 15, the mapper 46 is configured to map consecutive bus addresses across the different memory systems 39a–39c in an interleaved fashion. For example, assume that each bus address from processors 42 is eight bits of binary information and can range from 00000000 to 11111111. The first four consecutive memory addresses are 00000000, 00000001, 00000010, and 00000011. Programmers typically utilize the memory addresses in consecutive order. Therefore, if the address 00000000 is initially used to store a data value, then it is likely that address 00000001 will be the next new bus address used to store data. Then, it is likely that address 00000010 will be used followed by address 00000011. This pattern is likely to be continued until no more new bus addresses are needed or until all of the bus addresses have been used.

To map the foregoing consecutive bus addresses across the memory systems 39a–39c in an interleaved fashion, the mapper 46 may map the first bus address (00000000) to a memory unit address having a memory system identifier that identifies memory system 39a. The mapper 46 may then map the second bus address (00000001) to a memory unit address having a memory system identifier that identifies memory system 39b. The mapper 46 may then map the third bus address (00000010) to a memory unit address having a memory system identifier that identifies the remaining memory system 39c. This process is repeated for each new bus address received by mapper 46. For example, when the mapper 46 receives a storage request including the fourth bus address (00000011), the mapper 46 maps the fourth bus address to a memory unit address having a memory system identifier that identifies memory system 39a.

Each bus address mapped to the same memory system 39a, 39b, or 39c is preferably mapped into a memory unit address having a different memory unit offset. Therefore, although a set of bus addresses is mapped to the same memory system 39a, 39b, or 39c, each of the bus addresses is mapped to a unique memory unit address. Accordingly, each bus address of the foregoing set is mapped to a different location in the same memory system 39a, 39b, or 39c.

Through techniques similar to the techniques previously described herein, data may be retrieved from the memory units 55a–55c. In this regard, when one of the processors 42 executes an instruction to retrieve data, a retrieval request is transmitted by the processor 42 to the mapper 46 coupled to the processor 42. The retrieval request includes the bus address that indicates where the data is to be retrieved. The mapper 46 maps the bus address to a memory unit address including a memory system identifier and a memory unit offset. The memory system identifier identifies the memory system 39a, 39b, or 39c storing the requested data, and the memory unit offset identifies the location within the memory unit 55a, 55b, or 55c of the identified memory system 39a, 39b, or 39c where the data is actually stored.

The mapper 46 transmits a read request to each of the memory systems 39a–39c in response to the retrieval request. The read request includes the foregoing memory unit address translated from the bus address of the retrieval request. The memory controller 52a, 52b, or 52c of the identified memory system 39a, 39b, or 39c retrieves the data value in the associated memory unit 55a, 55c, or 55c at the location identified by the memory unit offset and transmits this data value to the requesting processing unit 37a, 37b, 37c, 37d, or 37e. In this regard, the memory controller 52a, 52b, or 52c may return the foregoing data value to the mapper 46, which transmits this data value to the requesting processing unit 37a, 37b, 37c, 37d, or 37e, or the memory controller 52a, 52b, or 52c may transmit the data value to the requesting processing unit 37a, 37b, 37c, 37d, or 37e without utilizing mapper 46.

There are a variety of situations when it may be desirable to change which memory unit address is mapped to a particular bus address. For example, as described in the Background of the Invention section, it may be desirable to remove one of the memory units 55a, 55b, or 55c in one of the memory systems 39a, 39b, or 39c. Therefore, the contents of the memory unit 55a, 55b, or 55c that is to be removed should be moved to another memory unit 55a, 55b, or 55c. Furthermore, each of the mappers 46 in the different processing units 37a–37e should be updated to account for the move.

In this regard, assume that memory unit 55a is to be removed and includes a data value stored at a location identified by a first memory unit offset. Assume further that the data value at this location should be moved to memory unit 55b and stored in this memory unit 55b at a location identified by a second memory unit offset. The values of the first and second memory unit offset values may be the same or may be different. Furthermore, to prevent data retrievals from and data stores to the location in memory unit 55a identified by the first memory unit offset once the data value has been moved, the mappings in each of the mappers 46 should be changed. In particular, the mappings should be changed such that the bus address mapped to the location in memory unit 55a identified by the first memory unit offset is mapped to the location in memory unit 55b identified by the second memory unit offset.

Preferably, the aforementioned data value is dynamically moved and the mappers 46 are dynamically updated in order to maximize the efficiency of the system 15. As used herein, the term "dynamic" shall be defined to refer to an occurrence in the computer system 12 while one or more computer applications are simultaneously running on one or more of the processing units 37a–37e and accessing data values from one or more memory systems 39a–39c.

Unless some of the techniques described hereinafter are employed, dynamic data moves and dynamic mapper updates would be difficult to achieve without errors. In this regard, as the data from memory unit 55a is being moved and as the mappers 46 are being updated, stores to and/or retrievals from the memory units 55a–55c may occur before the data is successfully moved and/or before each of the mappers 46 is updated. For example, a mapper 46 that has yet to be updated may map a bus address associated with a store request to a memory unit address identifying the location in memory unit 55a identified by the first memory offset, after the data at this location has already been moved. Unless steps are taken to account for such a possibility, the data associated with the store request may be stored in the memory unit 55a, and this newly stored data value may then be lost when the memory unit 55a is removed.

In another example, an updated mapper 46 may map a bus address associated with a retrieval request to a memory unit address identifying the location in memory unit 55b identified by the second memory offset, before the aforementioned data moved from memory unit 55a has been stored in memory unit 55b. Unless steps are taken to account for such a possibility, the data retrieved to satisfy the retrieval request may be incorrect and may eventually cause a data error.

The present invention enables the mappings that map bus addresses to memory unit addresses to be dynamically changed while ensuring that data errors do not occur as a result of the change to the mappings. In other words, the present invention enables the memory in memory systems 39a–39c to be reallocated while ensuring that data errors do not occur as a result of the reallocation. The techniques of the present invention may be utilized to safely move data from a first memory unit 55a, 55b, or 55c to another memory unit 55a, 55b, or 55c before the first memory unit 55a, 55b, or 55c is removed. However, as previously set forth, there may be other reasons for reallocating the memory in processing system 15, and the techniques of the present invention may be utilized to reallocate memory for a variety of reasons.

To illustrate the present invention, assume again that the memory unit 55a of the memory system 39a is to be removed from the processing system 15. Further assume that a data value at a location correlated with a first memory unit offset is stored in the memory unit 55a. Therefore, before removing the memory unit 55a, the data value should be moved to a location in a different memory unit 55b or 55c, and the bus address mapped to the aforementioned location in memory unit 55a should be mapped to the aforementioned location in the different memory unit 55b or 55c. As an example, assume that the "other" memory unit where the data value is to be moved is memory unit 55b. For simplicity, the location in memory unit 55a that stores the data value to be moved shall be referred to hereafter as the "source location," and the location in memory unit 55b that is to receive and store the moved data value shall be referred to hereafter as the "destination location."

To accomplish the foregoing, the system manager 36 is configured to cause a pointer to be stored in the destination location. In this regard, the system manger 36 may transmit a write request to the memory systems 39a–39c. The request may include data defining the pointer and the memory unit address identifying the memory location where the pointer is to be stored. In response to the write request, the memory controller 52b of the memory system 39b identified by the memory unit address in the write request stores the data defining the pointer in the memory location identified by the foregoing memory unit address.

There are a variety of other methodologies that may be employed to write the foregoing pointer to the destination location. For example, the memory system manager 36 may instruct one of the processors 42 to issue a storage request that causes the pointer to be written to the destination location. Such other methodologies may be employed without departing from the principles of the present invention.

The aforementioned pointer stored in the destination location points to or, in other words, identifies the source location and shall be referred to hereafter as the "source pointer." In this regard, the source pointer includes the memory unit address (i.e., the memory system identifier and the memory unit offset) of the source location.

In the preferred embodiment, each memory location includes a directory tag and a data portion. The data portion is a collection of bits that defines the data value stored in the memory location. Therefore, when a source pointer is stored in a memory location of one of the memory systems 55a–55c, the data portion of the memory location defines the memory unit address of the source location pointed to by the source pointer.

The directory tag is a set (i.e., one or more) of bits that is used to maintain certain control information. As an example, a particular bit of the directory tag of each of the memory locations in the memory units 55a–55c preferably indicates whether or not the data value stored in the data portion of the location defines pointer data or defines non-pointer data. This particular bit shall be referred to herein as the "data-type bit." For the purposes of illustration, it will be assumed that the data-type bit, if asserted, indicates that the data value stored in the data portion of the same memory location defines pointer data, and if de-asserted, the data-type bit indicates that the foregoing data value is a non-pointer data value.

Once the source pointer has been stored in the destination location, the system manager 36 is configured to cause the mappings in the mappers 46 of processing units 37a–37e to be changed or updated. In this regard, the system manager 36 may transmit a message to each mapper 46 instructing each mapper 46 to change its mappings such that the bus address mapped to the memory unit address identifying the source location is instead mapped to a memory unit address identifying the destination location. However, changing the mappings of each mapper 46 takes time. While the mappings are being changed, one of the mappers 46 that has yet to be updated may receive a request to retrieve data from or to store data to the source location. In this regard, the bus address associated with the request is mapped by the mapper 46 to a memory unit address that identifies the source location. Normally, in this situation, data is either stored into the source location or retrieved from the source location according to the techniques previously described herein, depending on whether the request is a storage request or a retrieval request.

However, if the foregoing request is received by a mapper 46 that has already been updated, then the foregoing bus address by the mapper 46 is mapped to a memory unit address identifying the destination location. Therefore, in the aforementioned example, the memory system 39b is identified by the foregoing memory unit address. Normally, in response to the memory unit address identifying the memory system 39b, the memory controller 32b is configured to access (i.e., either store data to or retrieve data from) the location in memory unit 55b correlated with the memory unit offset included in the memory unit address.

However, if the data-type bit of the value stored at the destination location (i.e., the location correlated with the received memory unit offset in the present example) indicates that the data in the destination location is pointer data, then the memory controller 32b is configured to return the source pointer of the destination location to the mapper 46 that transmitted the foregoing memory unit address. In response, the mapper 46 maps the bus address of the foregoing request to the memory unit address that identifies the location pointed to by the source pointer. In other words, the mapper 46 maps the bus address of the foregoing request to the memory unit address that identifies the source location. The foregoing request is then satisfied using the memory unit address identifying the source location.

Figure 5:
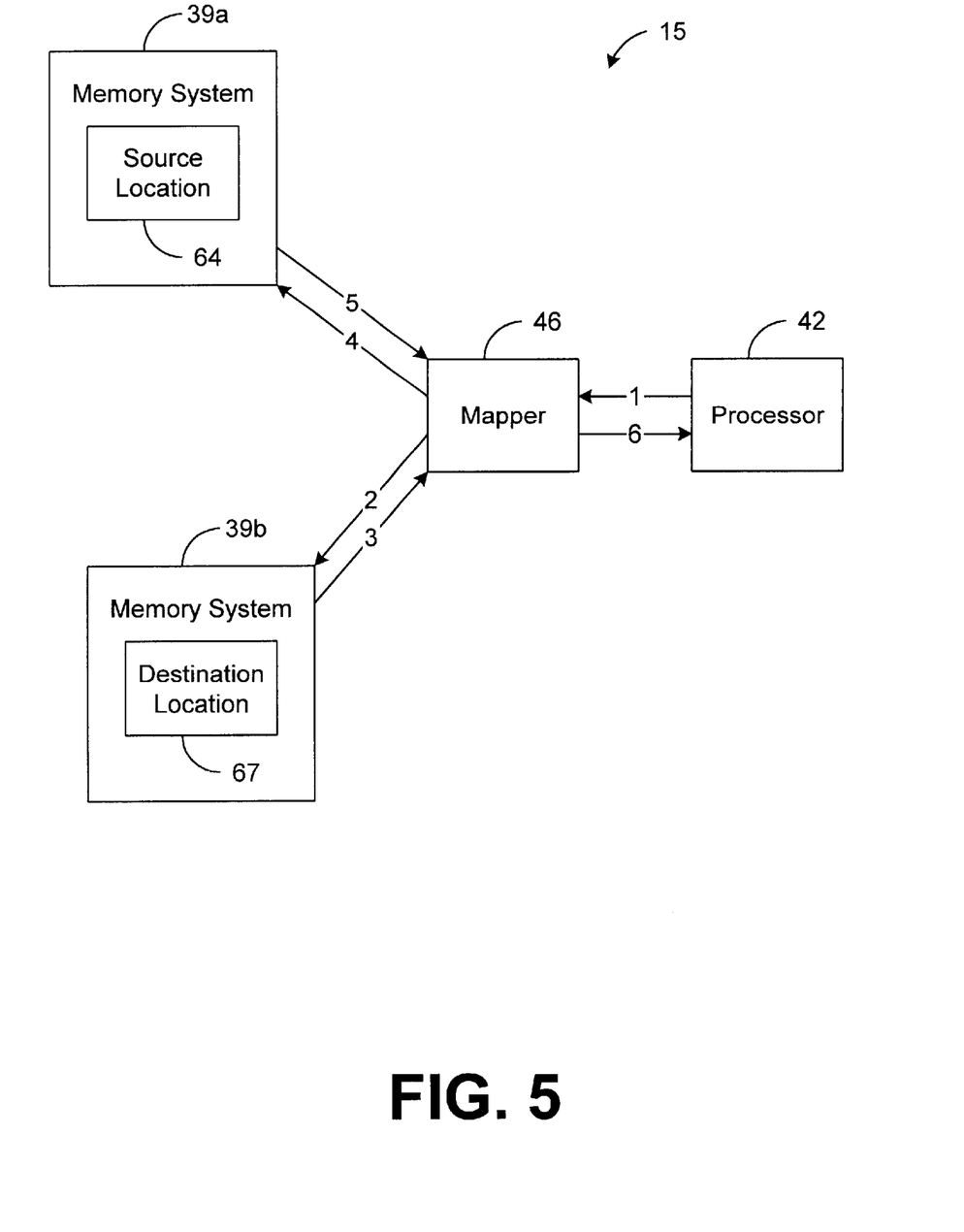
FIG. 5 depicts a diagram illustrating an exemplary transmission sequence for a request to access data while the mappers of the system depicted in FIG. 2 are being updated for a data move.

To better illustrate the aforementioned description, assume that the foregoing request is a retrieval request and that a particular mapper 46 receives the retrieval request while the mappers 46 are being updated and after the particular mapper 46 has been updated. A diagram illustrating such an example is depicted in FIG. 5. Each arrow in FIG. 5 represents a transmission from one component to another component. The numbers associated with arrows 1–6 in FIG. 5 are indicative of the transmission sequence in the foregoing example. In this regard, transmissions associated with arrows 1–6 occur in a sequential order based on each arrow's number, from lowest to highest, such that arrow 1 represents the first transmission of the sequence and arrow 6 represents the last transmission of the sequence.

As can be seen by referring to FIG. 5, the particular mapper 46 receives the retrieval request, as indicated by arrow 1. Since the particular mapper 46 has already been updated, the particular mapper 46 maps the bus address of the retrieval request to the memory unit address identifying the destination location 67, which is located in memory system 39b in the foregoing example. The mapper 46 then transmits a read request that includes the foregoing memory unit address, as represented by arrow 2 in FIG. 5. The memory system 39b identified by the memory system identifier included in the foregoing memory unit address receives the request and returns to the mapper 46 the data stored at the destination location 67, as represented by arrow 3 in FIG. 5. This data should include a data portion including a pointer pointing to the source location 64 and a directory tag portion indicating that the data portion includes pointer data.

Since the directory tag portion indicates that the data portion received by the mapper 46 is pointer data, the mapper 46 refrains from transmitting any of the received data to the processor 42 that issued the retrieval request. Instead, the mapper 46 determines the memory unit address of the source location 64 based on the pointer defined by the data portion and transmits a read request that includes the memory unit address of the source location 64, as represented by arrow 4 in FIG. 5. In the foregoing example, the source location 64 should be located in the memory system 39a and should be storing the data that is to be returned to the processor 42 that issued the retrieval request. In response to the read request, the memory system 39a transmits to the mapper 46 the data stored at the source location 64, as represented by arrow 5 of FIG. 5. This data should include a data portion and a directory tag portion indicating that the data portion includes non-pointer data. Since the directory tag portion indicates that the data portion includes non-pointer data, the mapper 46 returns the data portion to the processor 42 that issued the retrieval request, as represented as arrow 6 of FIG. 6. Thus, the retrieval request is correctly satisfied by the mapper 46.

Note that essentially the same process would be used to satisfy the foregoing request had the foregoing request been a storage request instead of a retrieval request. In such an example, arrow 1 of FIG. 5 would represent transmission of the storage request to the mapper 46. Arrow 2 would represent transmission of a write request identifying the destination location 67. Arrow 3 would represent transmission of the source pointer to the mapper 46. Arrow 4 would represent transmission of a write request identifying the source location 64. Based on this transmission, data would be written into the source location 64. In this example, arrow 5 is not necessary but may represent an acknowledgement that the write request has been satisfied. Similarly, arrow 6 is not necessary but may represent an acknowledgment that the storage request has been satisfied.

In an alternative embodiment, the memory controllers 52a–52c of memory systems 39a–39c may be configured to redirect requests to the appropriate memory systems 39a–39c when attempts to access a source pointer occur. For example, in the aforementioned example, the memory controller 52b of memory system 39b may be configured to transmit a request identifying the source location 64 directly to memory system 39a in response to a request transmitted by mapper 46 that identifies the destination location 67 (i.e., in response to the request represented as arrow 2 in FIG. 5). In response to the request transmitted by memory system 39b, the memory system 39a either retrieves the data stored in the source location 64 or writes data to the source location, depending on whether the request transmitted from memory system 39b is a read request or a write request. When the request transmitted by memory system 39b is a read request, the memory system 39a is designed to transmit to the mapper 46 the data retrieved from the source location 64 in response to the read request, as previously described.

Figure 6:
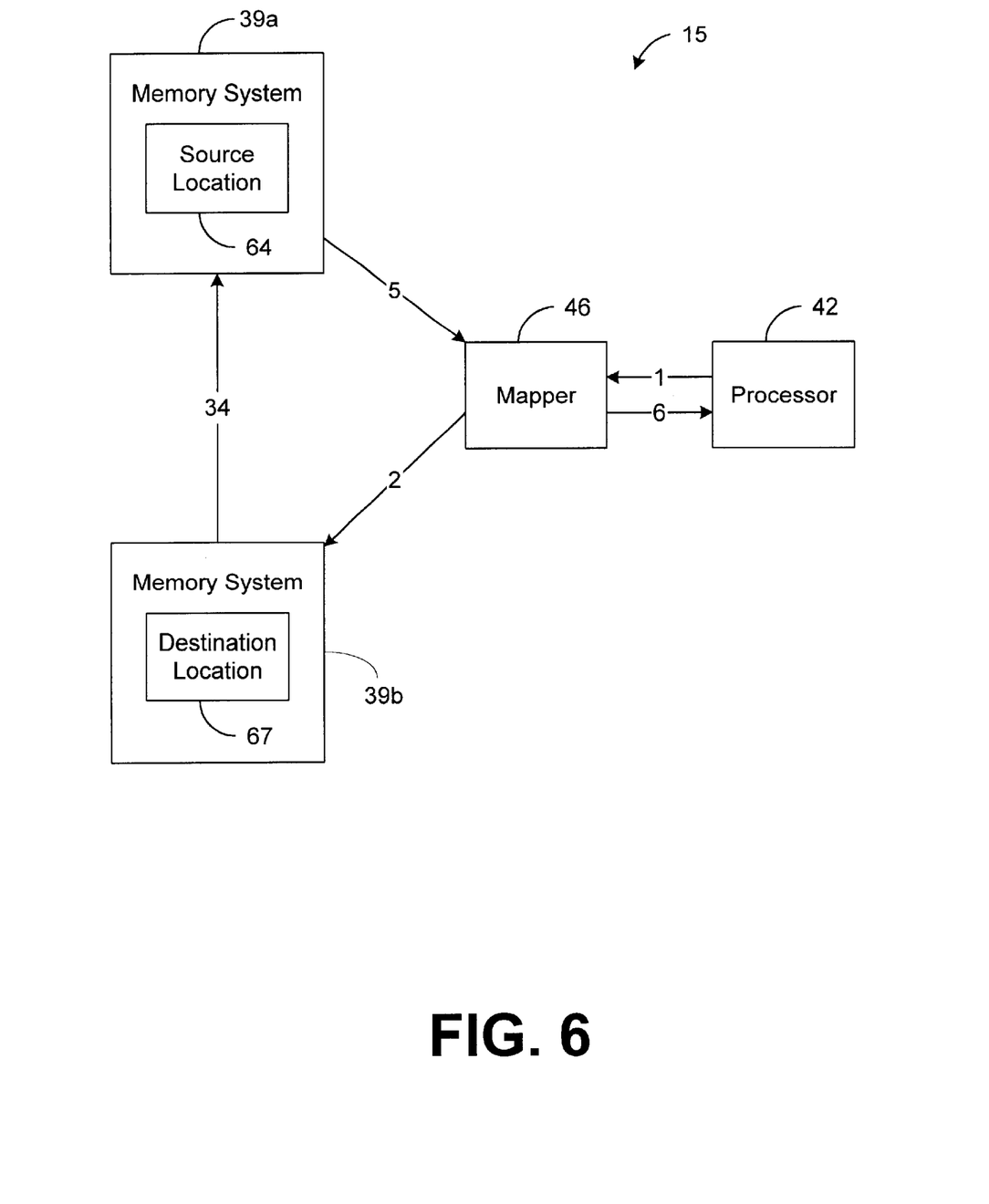
FIG. 6 depicts a diagram illustrating an alternative embodiment of the transmission sequence depicted in FIG. 5.

Such an example is depicted by FIG. 6. As can be seen by comparing FIG. 5 to FIG. 6, both aforementioned embodiments are the same except that arrows 3 and 4 of FIG. 5 are replaced by a single arrow 34 in FIG. 6. Arrow 34 represents the transmission of a request from memory system 39b to memory system 39a. This request should be of the same type (i.e., either read or write) as the request represented as arrow 2 and should include a memory unit address having a memory system identifier identifying memory system 39a and a memory unit offset corresponding to the source location 64.

Moreover, in either embodiment, any mapper 46 that receives one of the aforementioned requests while the mappers 46 are being updated ultimately maps the bus address of the received request to the memory unit address that identifies the source location 64, regardless of which mappers 46 have been updated by the system manager 36. As a result, the same bus addresses of the storage and/or retrieval requests received by a mapper 46 during the updating of mappers 46 is mapped to the same memory unit address, thereby eliminating potential data errors introduced by the updating step.

Once the update of the mappers 46 is complete, the system manager 36 causes the data value at the source location 64 to be copied to the destination location 67. The system manager 36 may issue the read and write requests for the copying directly to the memory systems 39a and 39b or may issue retrieval and storage requests for the copying to one or more mappers 46. Alternatively, the system manager 36 may instruct one or more of the processors 42 in one or more of the processing units 37a–37e to issue appropriate retrieval and storage requests. In another alternative embodiment, the system manager 36 may issue a copy request, and the memory controller 42a of the memory system 39a of the source location 64 may retrieve the data from the source location 64 and transmit this data via a write request to the appropriate memory controller 42b of the destination location 67. There are a variety of other embodiments that may be employed to copy the data of the source location 64 to the destination location 67.

In each of the foregoing embodiments, the source pointer stored at the destination location 67 is replaced or overwritten by the data from the source location 64. For example, assume that the system manager 36 achieves the copying by instructing a processor 42 to issue appropriate retrieval and storage requests. In this embodiment, the system manger 36 first transmits an instruction to a processor 42 to copy data from the source location 64 to the destination location 67. In response, the processor 42 transmits to its mapper 46 a retrieval request requesting retrieval of the source location data. In this regard, the retrieval request should include a bus address that, when mapped by the mapper 46, is mapped to a memory unit address identifying the source location 64. In response to the retrieval request, the mapper 46 maps the bus address of the retrieval request into a memory unit address identifying the source location 64. The mapper 46 then transmits to the memory systems 39a–39c a read request including the memory unit address that identifies the source location 64.

The memory controller 52a of the identified memory system 39a retrieves the data value from the source location 64 and returns the data value to the mapper 46, which returns the data value to the processor 42 that issued the foregoing retrieval request. This processor 42 then includes this data value in a storage request along with a bus address that, when mapped by the mapper 46, is mapped to a memory unit address identifying the destination location 67. In response, the mapper 46 maps the foregoing bus address into a memory unit address identifying the destination location 67 and transmits to memory systems 39a–39c a write request that includes the foregoing memory unit address and the data value previously retrieved from the source location 64. In response to the write request, the memory controller 52b of the memory system 39b identified by the memory unit address in the write request stores the data value in the write request into the destination location 67.

When the data value at the source location 64 is read from the source location 64 during a copy of the data value to the destination location 67, a particular bit (hereinafter referred to as the "copy bit") of the directory tag at the source location 64 is preferably asserted to indicate that the data value at the source location 64 has been copied. To accomplish the foregoing, the memory system 39b should be notified by the system manager 36, for example, when a read of the source location 64 is performed in satisfying a copy of the source location 64 to the destination location 67.

When the copy bit is asserted, the memory controller 52a is configured to refrain from storing or retrieving data from the source location 64. Since the copy from the source location 64 to the destination location 67 occurs after the mappings in the mappers 46 have been updated, an attempt to access the source location 64 when its copy bit is asserted should occur only: (1) when an attempt to access the data value of the destination location 67 has occurred after the copy of the source destination has been initiated and (2) before the destination location 67 has been updated with the data value of the source location 64.

For example, consider a situation in which the bus address of a request received by one of the mappers 46 is received by the one mapper 46 after each of the mappers 46 has been updated to account for the aforementioned data move (i.e., the data move from the source location 64 to the destination location 67). Further, assume that the data at the source location 64 has been read from the source location 64 but has yet to be written to the destination location 67. In other words, the copying of data from the source location 64 to the destination location 67 has begun but has yet to complete. As a result, the destination location 67 should be storing a pointer to the source location 64, and according to the aforementioned techniques, an attempt to access the data value of the source location 64 is made to satisfy the foregoing request. However, at this time, the copy bit of the source location 64 should be asserted indicating that the process of copying the data value of the source location 64 to the destination location 67 has been initiated.

When this occurs, the memory controller 52a attempting to access the source location 64 preferably transmits a message to the foregoing mapper 46 indicating that the attempt to satisfy the request should be re-tried. As a result, the mapper 46 maps the bus address of the request to the memory unit address identifying the destination location 67, and another attempt is made to access the data at the destination location 67. By this time, the copying of data from the source location 64 to the destination location 67 may be complete such that the destination location 67 no longer is storing a pointer to the source location 64 but is instead storing the data value copied from the source location 64. As a result, the destination location 67 is successfully accessed to satisfy the foregoing request according to the techniques previously described. However, if the copying of data from the source location 64 to the destination location 67 is not complete, then the destination location 67 should still be storing the source pointer, and the above described process should be repeated until the data from the source location 64 is successfully written to the destination location 67.

Figure 7:
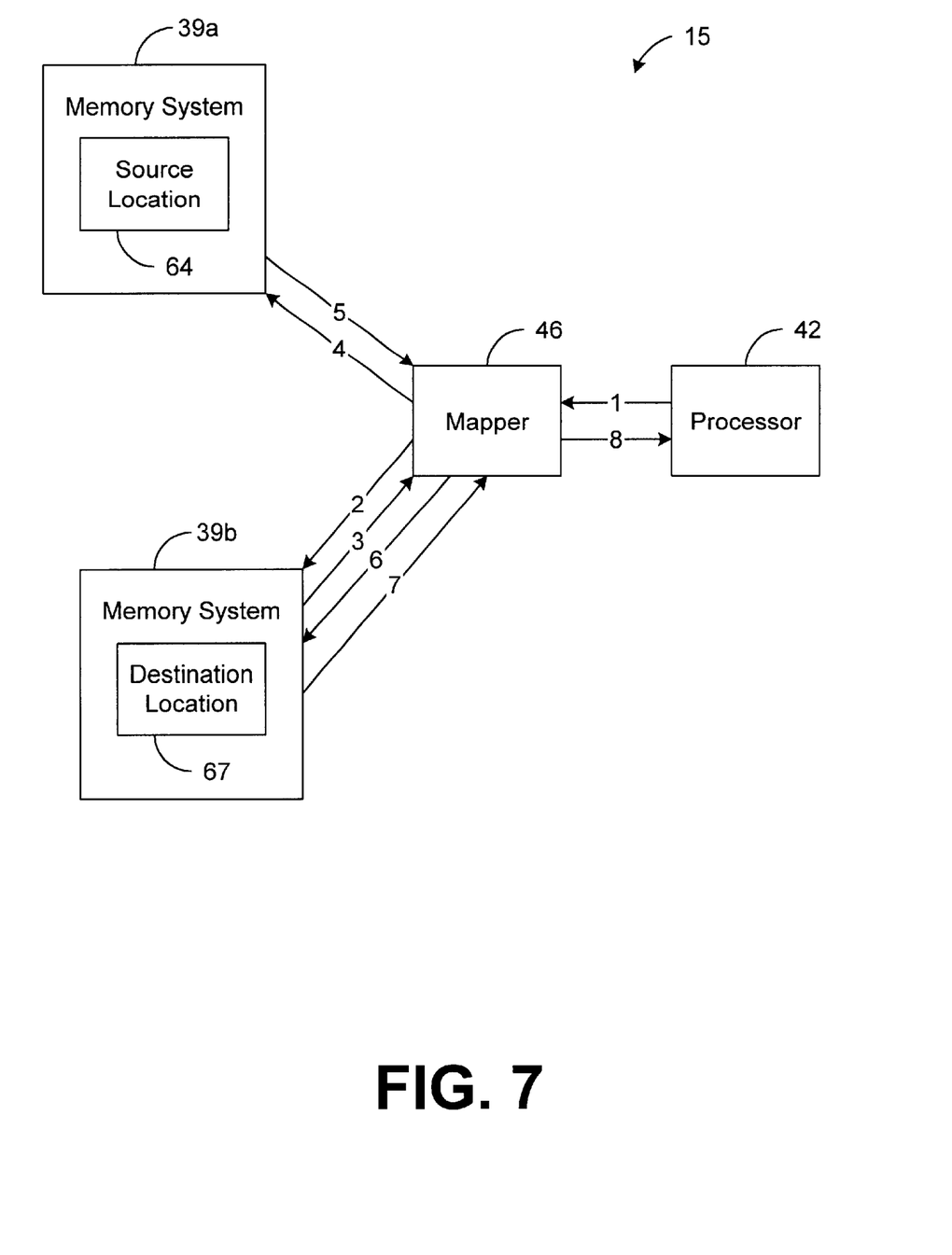
FIG. 7 depicts a diagram illustrating an exemplary transmission sequence in the system depicted in FIG. 2 for a request to access data while data is being copied from the source location to the destination location.

To better illustrate the foregoing description, assume that a processor 42 transmits a retrieval request for the data value being moved from the source location 64 to the destination location 67. This data value has been read from the source location 64 but has yet to be written to the destination location 67. A diagram illustrating such an example is depicted in FIG. 7. Each arrow in FIG. 7 represents a transmission from one component to another component. The numbers associated with arrows 1–8 in FIG. 7 are indicative of the transmission sequence in the foregoing example. In this regard, transmissions associated with arrows 1–8 occur in a sequential order based on each arrow's number, from lowest to highest, such that arrow 1 represents the first transmission of the sequence and arrow 8 represents the last transmission of the sequence.

Referring to FIG. 7, the transmission of the retrieval request to the mapper 46 is represented as arrow 1. The mapper 46 maps the bus address of the retrieval request to a memory unit identifier identifying the destination location 67. The mapper 46 then transmits a read request, represented as arrow 2 in FIG. 7, to memory system 39b requesting retrieval of the data value at the destination location 67. The memory controller 52b in the memory system 39b returns to the mapper 46 the source pointer stored at the destination location 67, as represented as arrow 3 in FIG. 7.

In response, the mapper 46 transmits to the memory system 39a a read request, represented as arrow 4 in FIG. 7, identifying the source location 64 pursuant to the techniques previously describer hereinabove. However, the memory controller 52a of the memory system 39a refrains from retrieving data from the source location 64, since the copy bit of the source location 64 is asserted, thereby indicating that the data portion of the source location 64 has been copied to another location. Moreover, the memory controller 52a transmits a notification message, represented as arrow 5 in FIG. 7, to mapper 46 indicating that the data value at the source location 64 has been copied.

In response, the mapper 46 tries to satisfy the retrieval request again. In this regard, the mapper 46 transmits a read request, represented as arrow 6 in FIG. 7, identifying the destination location 67 (i.e., the location identified by the memory unit address mapped from the bus address of the retrieval request being satisfied). By this time, the data value copied or moved from the source location 64 may now be written to the destination location 67. If so, the destination location 67 no longer stores the source pointer but instead stores the data value copied from the source location 64.

Therefore, pursuant to the techniques previously described hereinabove, the memory controller 52b of the memory system 39b receives the foregoing read request and, in response, retrieves the data stored in the destination location 67. The memory controller 52b then transmits this data, represented as arrow 7, to the mapper 46, and based on this data, the mapper 46 transmits to the processor 42 the data value requested by the processor 42, as represented as arrow 8 in FIG. 7. Thus, the correct data is returned to the processor 42 even though the retrieval request from the processor 42 is issued while the data value from the source location 64 is being moved to the destination location 67.

However, if the data value copied or moved from the source location 64 has yet to be written to the destination location 67 upon the occurrence of arrow 6 of FIG. 7, then arrows 3–6 are repeated until the data value copied or moved from the source location 64 is written the destination location 67. Once this occurs, arrows 7 and 8 may occur.

Note that essentially the same process would be used to satisfy the foregoing request had the foregoing request been a storage request instead of a retrieval request. In such an example, arrow 1 of FIG. 7 would represent transmission of the storage request to the mapper 46. Arrow 2 would represent transmission of a write request identifying the destination location 67. Arrow 3 would represent transmission of the source pointer to the mapper 46. Arrow 4 would represent transmission of a write request identifying the source location 64. Arrow 5 would represent transmission of notification that the data at the source location 64 has been copied. Arrow 6 would represent transmission of a write request identifying the destination location 67. Based on this transmission, data would be written into the destination location 67, if the data value copied or moved from the source location 64 has been written to the destination location 67. In this example, arrow 7 is not necessary but may represent an acknowledgement that the write request has been satisfied. Similarly, arrow 8 is not necessary but may represent an acknowledgment that the storage request has been satisfied. If the data value copied or moved from the source location 64 has not been written to the destination location 67 upon the occurrence of arrow 6, then arrows 3–6 are repeated, as described above.

Figure 8:
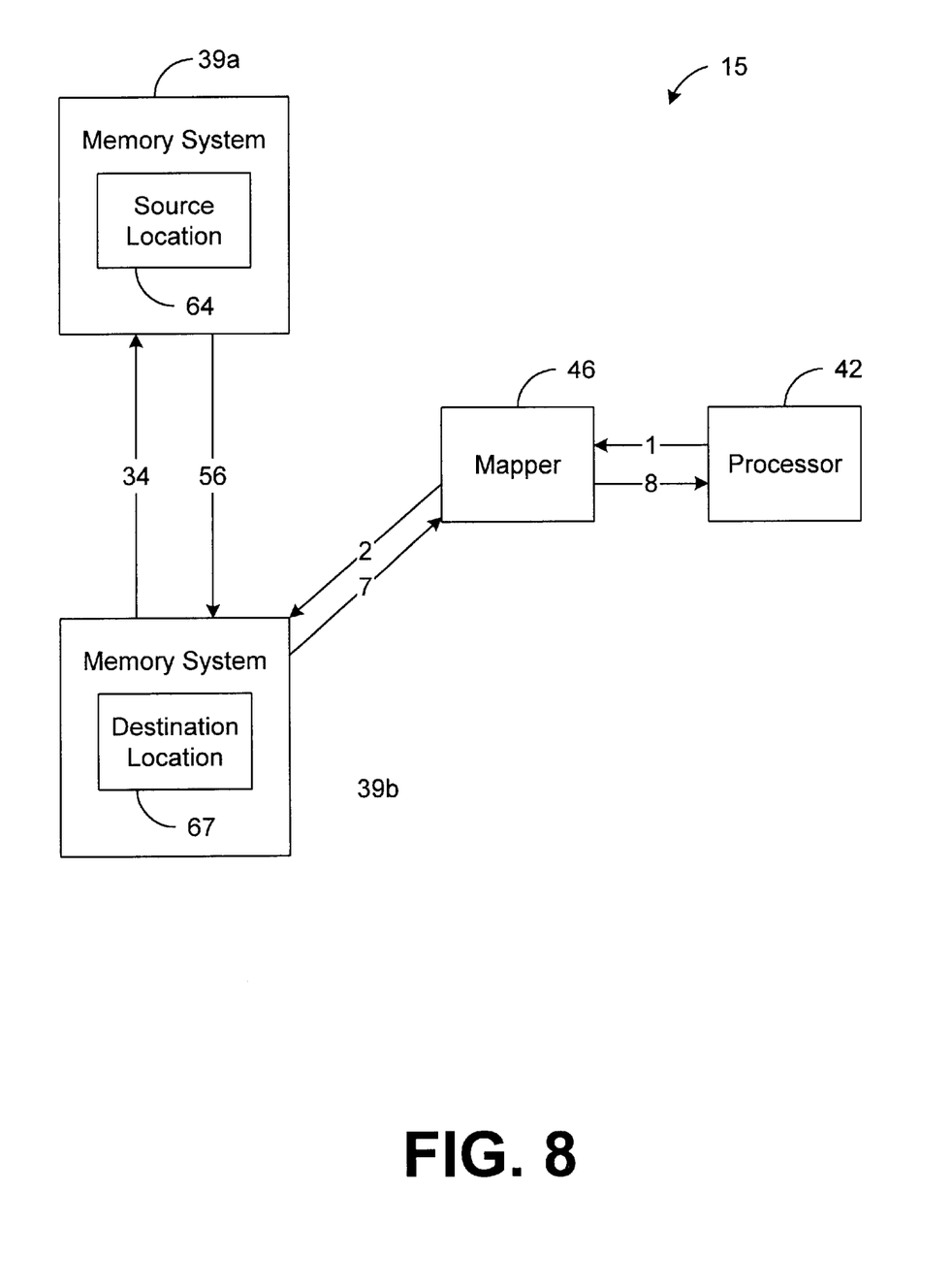
FIG. 8 depicts a diagram illustrating an alternative embodiment of the transmission sequence depicted in FIG. 7.

In an alternative embodiment, the memory controllers 52a–52c of memory systems 39a–39c may be configured to redirect requests to the appropriate memory systems 39a–39c when attempts to access a source pointer or attempts to access a data associated with an asserted copy bit occur. Such an example is depicted by FIG. 8. As can be seen by comparing FIG. 7 to FIG. 8, both of the foregoing embodiments are the same except that arrows 3 and 4 of FIG. 7 are replaced by a single arrow 34 in FIG. 8 and that arrows 5 and 6 of FIG. 7 are replace by a single arrow 56 in FIG. 8. Arrow 34 represents the transmission of a request from memory system 39b to memory system 39a. This request should be of the same type (i.e., either read or write) as the request represented as arrow 2 and should include a memory unit address having a memory system identifier identifying memory system 39a and a memory unit offset corresponding to the source location 64. Furthermore, arrow 56 represents the transmission of a request from memory system 39a to memory system 39b. This request should be of the same type (i.e., either read or write) as the request represented as arrow 34 and should include a memory unit address having a memory system identifier identifying memory system 39b and a memory unit offset corresponding to the destination location 64.

Moreover, once the data value from the source location 64 replaces the source pointer in the destination location 67, the reallocation of the source location 64 to the destination location 67 is essentially complete. In this regard, the data value from the source location 64 has been written to the destination location 67, and none of the bus addresses received by any of the mappers 46 should be mapped into the memory unit address identifying the source location 64. The bus address of any request that accesses the foregoing data value should be mapped to the destination location 67 instead of the source location 64.

Once the aforementioned process is performed for each data value stored in the memory unit 55a, the memory unit 55a may be removed from the system 15 without causing any data errors. However, it should be reemphasized that the foregoing techniques for reallocating a source location 64 to a destination location 67 may be utilized for various reasons and that it is not necessary for the reallocation to occur in order to enable the removal of a memory unit 55a. For example, it may be desirable to reallocate memory when additional memory units are added, or it may be desirable to reallocate memory among various protection domains. There may be other reasons for reallocating memory according to the techniques of the present invention.

It should be noted that it is not necessary to maintain the directory tag information described herein in the memory units 55a–55c. For example, it is possible to maintain such information in control registers (not shown) provided the directory tag information can be appropriately correlated with the data information stored in the memory units 55a–55c.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A computer system for processing data and for dynamically moving data in memory, comprising:

a plurality of memory units, each of said memory units having memory locations for storing data;

a mapper having a plurality of mappings, said mapper configured to receive a request to access a data value, said request including a bus address, said mapper configured to translate said bus address into a memory unit address based on one of said mappings, said memory unit address identifying one of said memory locations that is storing said data value; and a system manager configured to cause said data value to be moved from said one memory location to another of said memory locations, said system manager configured to cause a pointer to be stored in said other memory location, said pointer identifying said one memory location, said system manager further configured to cause said one mapping to be updated, while said pointer is stored in said other memory location, such that said mapper is configured to translate said bus address into a memory unit address identifying said other memory location.

2. The system of claim 1, further comprising:

a first memory controller coupled to one of said memory units, said first memory controller configured to access said pointer in said other memory location based on said memory unit address identifying said other memory location, said memory controller configured to transmit said memory unit address identifying said one memory location in response to said pointer.

3. The system of claim 2, further comprising a second memory controller coupled to one of said memory units, said second memory controller configured to access said data value stored at said one memory location based on said memory unit address transmitted by said first memory controller.

4. The system of claim 1, wherein said system manager is further configured to cause at least one bit of data correlated with said one memory location to be changed to a different logical value when said data value is copied from said one memory location, and wherein said system further comprises:

a memory controller coupled to one of said memory units, said memory controller configured to access data at said one memory location based on a memory unit address transmitted from said mapper, said memory controller further configured to transmit, in response to said memory unit address transmitted from said mapper, a message to said mapper based on said at least one bit of data when said at least one bit of data exhibits said different logical state, wherein said mapper is configured to transmit said memory unit address identifying said other memory location in response to said message.

5. A method for dynamically moving data from one memory location to another memory location, comprising the steps of:

mapping bus addresses to memory unit addresses based on a plurality of mappings, said memory unit addresses identifying a plurality of memory locations including a destination memory location and a source memory location;

storing a pointer at said destination memory location, said pointer identifying said source memory location;

updating, while said pointer is stored in said destination memory location, at least one of said mappings that correlates one of said bus addresses with one of said memory unit addresses identifying said source location such that said at least one mapping correlates said one bus address with one of said memory unit addresses identifying said destination location;

storing, subsequent to said updating step, a data value from said source memory location into said destination memory location;

accessing said pointer from said destination location; and accessing, based on said pointer, said data value from said source location in response to said accessing said pointer step.

6. The method of claim 5, wherein said storing a pointer step includes the step of changing at least one bit of data correlated with said destination memory location, and wherein said accessing said data value step includes the step of determining that said destination memory location includes pointer data based on said at least one bit.

7. The method of claim 5, further comprising the step of:

performing said accessing said pointer step in response to a request from a processor, said request including said one bus address, said mapping step including the step of mapping said one bus address in said request into said one memory unit address identifying said destination memory location.

8. The method of claim 5, further comprising the steps of:

reading said data value from said source memory location;

changing at least one bit of data correlated with said source memory location in response to said reading step;

analyzing said at least one bit; and accessing, subsequent to said changing step, said data value from said destination memory location based on said at least one bit.

9. The method of claim 8, wherein said mapping step includes the step of mapping said one bus address into said one memory unit address identifying said source memory location, and wherein said method further comprises the step of:

performing said analyzing step based on said one memory unit address identifying said source memory location.

10. A method for dynamically reallocating memory, comprising the steps of:

providing a plurality of mappers, each of said mappers having a plurality of mappings including a mapping that maps a particular bus address to a memory unit address identifying a source memory location;

receiving bus addresses;

mapping said bus addresses to memory unit addresses based on said mappings;

accessing data based on said memory unit addresses mapped from said bus addresses;

dynamically updating each of said mappers such that said particular bus address is mapped, by each of said mappers, to a memory unit address identifying a destination memory location;

moving a data value from said source memory location to said destination memory location;

executing an instruction during said updating step;

accessing, during said updating step, one of said source and destination locations in response to said executing step;

determining, based on data accessed in said accessing step, whether said one location has been updated via said moving step; and accessing said data value from one of said source and destination locations in response to said determining step.

11. The method of claim 10, further comprising the step of storing a pointer in said destination memory location, said pointer identifying said source memory location, wherein said moving step comprises the steps of:

reading said data value from said source memory location; and storing, in said destination memory location, said data value read in said reading step.

12. The method of claim 11, wherein said determining step further comprises the step of analyzing at least one bit of data correlated with said source memory location in response to one of said bus addresses, said at least one bit indicating whether said reading step has occurred.

13. The method of claim 11, further comprising the steps of:

accessing said pointer stored in said destination memory location in response to one of said requests, said one request including said one bus address; and accessing said data value from said source memory location in response to said accessing said pointer step.

14. The method of claim 13, wherein said mapping step includes the step of mapping said one bus address included in said one request into said memory unit address identifying said destination memory location.

15. A method for dynamically reallocating memory, comprising the steps of:

mapping bus addresses to memory unit addresses based on a plurality of mappings, said memory unit addresses identifying a plurality of memory locations including a destination memory location and a source memory location, as least one of said mappings correlating one of said bus addresses with one of said memory unit addresses identifying said source location;

determining that a data value is to be moved from said source memory location to said destination memory location;

updating, in response to said determining step, said at least one mapping such that said at least one mapping correlates said one bus address with one of said memory unit addresses identifying said destination location;

moving, in response to said determining step, said data value from said source memory location into said destination memory location;

storing, prior to said moving step and in response to said determining step, an indicator at said destination memory location, said indicator indicating that said data value has yet to be moved into said destination location; and accessing said data value based on said at least one mapping and said indicator.

* * * * *